UNITED STATES PATENT OFFICE.

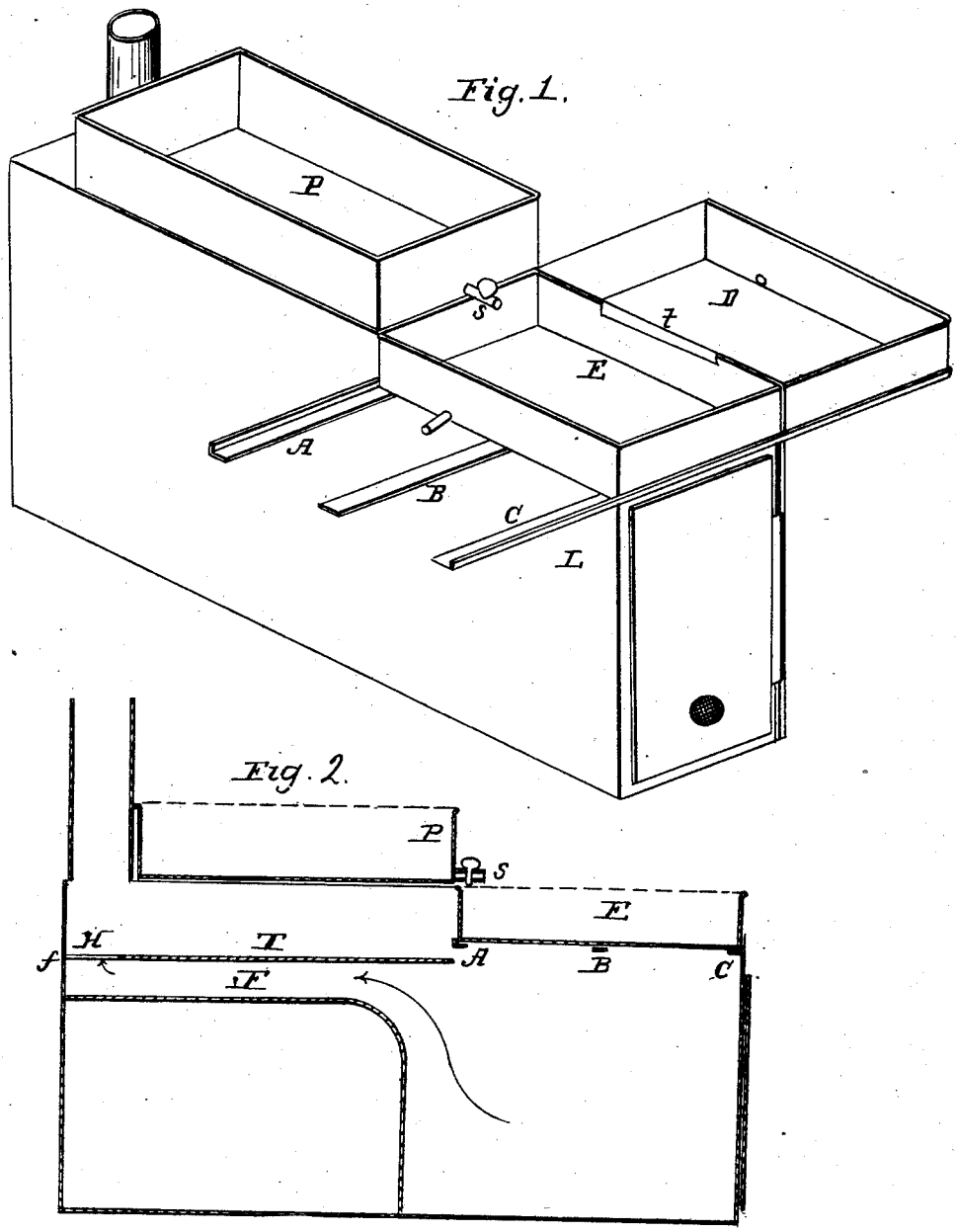

CHARLES HARVEY, OF RICHMOND, INDIANA.

IMPROVEMENT IN APPARATUS FOR EVAPORATING SUGAR-JUICES.

Specification forming part of Letters Patent No. 28,171, dated May 8, 1860.

*To all whom it may concern:*

Be it known that I, CHARLES HARVEY, of Richmond, in the county of Wayne and State of Indiana, have invented a new and Improved Mode of Evaporating Cane-Juice; and I do hereby declare that the following is a full and correct description thereof, of which—

Figure 1 is a perspective view. Fig. 2 shows a vertical taken through the center from front to rear.

The nature of my invention consists in providing two pans, each the width of the heating-surface of the furnace, and hinged to each other at their sides to render them more portable and to allow one to be inclined while the other is on a level, and supported on guides or ways which pass at right angles with the furnace and allow one pan to be in contact with the heat while the sirup is being drawn from the other not in contact, thus avoiding any tendency to burn while drawing off.

To enable others to make and use my invention, I will describe its construction and operation.

I construct my evaporator with a series of pans, one slightly elevated above another that the juice may flow from the upper to the lower or front pans, being two in number, and each of the same width as the upper pan; but to obviate the danger of burning the sirup I provide guides or ways A B C, secured to the furnace L, (at right angles,) which may be made of either brick or iron. Upon the ways I place the hinged pans D E, either one of which is the width of the furnace; so by the removal of either of these pans by sliding laterally upon the guides you displace one, which is replaced by its fellow. It also becomes necessary, in case that the fire should get too hot, that a damper, T, be placed between and at a suitable distance from the pan P and the lower side of the flue F, that by its being moved within a short distance from the back of the flue *f* an opening is left at H, at the same time shutting off the opening I, which changes the direction of the heat, taking it away from the pans P and D E and allowing it to assume the direction of the arrows; but if more heat is desired, by sliding the damper back, the heat not having access through the opening H after it is closed, thereby allowing the heat to come into direct contact with the under surface of the evaporating-pans, or partially, as the damper T is adjusted. The juice may be admitted into the pan P from a suitable reservoir by a spigot as fast as may be sufficient to supply the evaporation. From this pan the juice flows through the spigot S into the lower pans, D E. When the juice has become sirup suitable to be drawn off, less heat is required, which is easily accomplished by drawing the damper T forward, which shuts the draft off at I and allows it to pass through at H, thus changing the direction of the heat and allowing the pans to get comparatively cool. The pan D is then removed from over the fire by sliding it upon the ways A B C, and the pan E, being hinged to it at *t*, will take its position over the furnace L, ready to receive juice from the pan P through the spigot S. Then, again, the damper may be moved back, leaving an opening at I, which allows the heat to take its former course against the pans, thus keeping fresh juice constantly over heating-surface.

I do not claim two or more pans arranged one above another, nor do I claim the use of a damper to change the direction of the heat; but What I do claim, and desire to secure by Letters Patent, is—

The hinged pans D E, arranged substantially as described, and for the purpose set forth.

CHARLES HARVEY.

Witnesses:
   ADDISON H. NORDYKE,
   JAMES PLUMMER.